(12) United States Patent
Bartonek

(10) Patent No.: US 6,881,951 B2
(45) Date of Patent: Apr. 19, 2005

(54) TIME PHASED CONSTANT IR ENERGY DELTA SOURCE

(75) Inventor: Mark Bartonek, Blue Springs, MO (US)

(73) Assignee: General Electric Company, Schnectady, NY (US)

(*) Notice: Subject to any disclaimer, the term of this patent is extended or adjusted under 35 U.S.C. 154(b) by 152 days.

(21) Appl. No.: 10/249,878

(22) Filed: May 14, 2003

(65) Prior Publication Data
US 2003/0168584 A1 Sep. 11, 2003

Related U.S. Application Data

(60) Provisional application No. 60/426,510, filed on Nov. 15, 2002.

(51) Int. Cl.[7] ................................................. G01J 5/00
(52) U.S. Cl. .................................................. 250/252.1
(58) Field of Search .............................. 250/252.1, 338

(56) References Cited

U.S. PATENT DOCUMENTS

| | | | |
|---|---|---|---|
| 4,928,910 A | 5/1990 | Utterback et al. | |
| 4,974,797 A | 12/1990 | Myers et al. | |
| 5,060,890 A | 10/1991 | Utterback et al. | |
| 5,100,243 A | 3/1992 | Grosskopf et al. | |
| 5,127,742 A | * 7/1992 | Fraden | ........................ 374/129 |
| 5,149,025 A | 9/1992 | Utterback et al. | |
| 5,331,311 A | 7/1994 | Doctor | |
| 5,335,995 A | 8/1994 | Villar | |
| 5,446,452 A | 8/1995 | Litton | |
| 5,660,470 A | 8/1997 | Mench | |

* cited by examiner

*Primary Examiner*—David Porta
*Assistant Examiner*—Marcus Taningco
(74) *Attorney, Agent, or Firm*—Carl A. Rowold

(57) ABSTRACT

Apparatus for delivering a constant radiant energy delta to calibrate a railway hot box detector. A wheel including an aperture is rotatingly supported within the apparatus. A temperature sensor senses the temperature of the wheel, and a radiant energy source is mounted within the apparatus such that the wheel, when rotated, periodically allows radiant energy to be transmitted directly from the energy source through the aperture to a hot box detector being calibrated. A processor is provided to receive the temperature sensed by the temperature sensor and operate the energy source at a radiant energy setpoint by determining the present temperature of both the energy source and the present temperature of the wheel and the desired radiant energy delta.

20 Claims, 2 Drawing Sheets

TIME PHASED CONSTANT IR ENERGY DELTA SOURCE

CROSS REFERENCE TO RELATED APPLICATIONS

The present invention claims priority to U.S. Provisional Patent Application Ser. No. 60/426,510 filed Nov. 15, 2002, the contents of which are expressly incorporated herein by reference.

BACKGROUND OF INVENTION

The present invention relates to railway hot box detectors; and more specifically, to a railway hot box detector calibration device.

Prior art hot box detector calibrators employ a black body heat source and a rotating wheel having an aperture therein. When the heat source, aperture and hot box detector are in alignment, infrared energy is transmitted directly from the hot box detector calibrator to the hot box detector and when the heat source, aperture and hot box detector are not in alignment, the wheel blocks the direct transmission of infrared (IR) energy to the detector. In this manner, an infrared energy difference (delta) is created as the wheel rotates and the wheel either allows energy to pass through the aperture or the wheel blocks the energy source. It is the precision in determining this difference in energy that is critical in calibrating the hot box detector. However, a problem exists in prior art hot box detector calibrators in that most hot box detector calibrators calculate the delta by assuming that the energy transmitted by the wheel is either a constant value or merely sense the temperature of the environment assume the wheel is at the same temperature as the environment. Therefore, the reference value of the infrared energy delta is an assumed rather than sensed value. As such, prior art hot box detector calibrators cannot provide the high level of precision or accuracy in their delta values required for proper calibration.

SUMMARY OF INVENTION

The present invention comprises apparatus for calibrating a railway infrared hot box or hot wheel detector by delivering a desired radiant energy delta to the hot box detector. The apparatus comprises a source of radiant energy source adapted to be positioned adjacent to the hot box detector being calibrated for emitting radiant energy along a path toward the hot box detector. A shutter device is positioned between the source of radiant energy and the hot box detector along the path. The shutter device is selectively operable between a first mode of operation in which the shutter device permits radiant energy to be transmitted from the source to the hot box detector along the path and a second mode of operation in which the shutter blocks the transmission of radiant energy from the source to the detector. A temperature sensor senses a temperature of the shutter device. A processor responsive to the temperature sensed by the temperature sensor operates the energy source at a desired temperature setpoint based on the temperature of the shutter device and the desired radiant energy delta.

The foregoing and other objects, features, and advantages of the invention as well as presently preferred embodiments thereof will become more apparent from the reading of the following description in connection with the accompanying drawings.

BRIEF DESCRIPTION OF DRAWINGS

Corresponding reference numerals indicate corresponding parts throughout the several figures of the drawings.

DETAILED DESCRIPTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

A Calibrated Heat Source (CHS) is a device that delivers time phased IR energy impulses for the purposes of calibrating Hot Box Detector (HBD) systems or Hot Wheel Detector (HWD) systems. HBDs are normally attached to or near railroad rails and are used to detect overheated conditions in the wheel or bearing of a railroad car. The CHS generally consists of a heated black body that radiates IR energy. The IR energy radiated by the black body is "chopped" by a rotating wheel containing an aperture where the wheel alternately blocks or passes the black body IR energy out of the device. The chopper wheel itself radiates IR energy at a level near the external operating temperature of the device. Prior art calibration devices measure the external operating temperature of the device. An operator calibrating an HBD system with the prior art equipment manually adjusts a heater to vary the black body temperature based upon the observed external operating temperature of the device and the measured temperature of the black body to set the IR power delta to be a predetermined level. Calibration errors arise when the temperature of the wheel is not the same as that of the external operating temperature and in assuming that a constant temperature delta equates to a constant IR energy radiation delta, regardless of the absolute temperature involved. In the present invention, both the temperature of the black body and the temperature of the chopper wheel are directly monitored by the CHS and that data is then used to automatically control the heating of the black body, based on calculations of the level of IR energy radiated. By doing this, the resultant IR energy delta can be kept constant throughout the environmental operating range of the device.

The primary requirement addressed by the CHS is delivery of a time phased constant IR energy delta over a broad range of operating conditions. The time phase of the energy delta is preferably an IR energy cycle of once every 180 to 260 msec, with the IR energy delta equivalent to the energy difference of two black bodies, one at a temperature of 200 Â ° F. and the other at a temperature of 70 Â ° F., when operating in a temperature range of –40 Â ° F. to 120 Â ° F.

Figure 1:
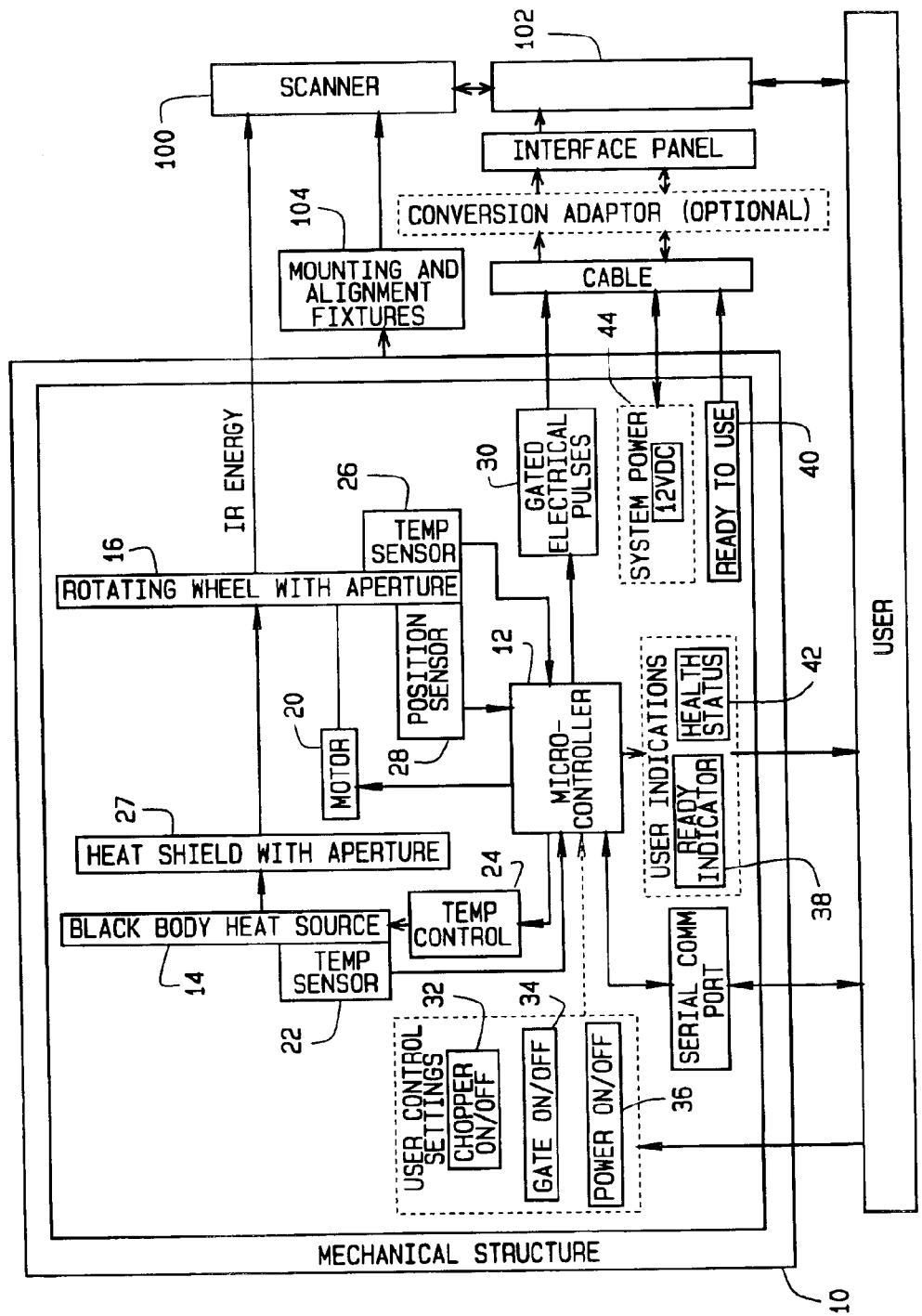
FIG. 1 is a block diagram of the apparatus of the present invention.

Referring to FIG. 1, there is shown a CHS 10, a scanner 100 and a HBD or HWD 102. CHS 10 comprises a microcontroller 12, a black body heat source 14 and a rotating wheel 16 having an aperture 16a therein. Rotating wheel 16 is operated by a DC electric motor 20 and as the wheel 16 rotates, infrared energy is allowed to pass through wheel 16 when aperture 16a is in alignment with an opening of black body heat source 14 and infrared energy is blocked from passing wheel 16 when the aperture is not in alignment with the opening of black body heat source 14. The motor speed is controlled by an output of microcontroller 12. CHS 10 further comprises a temperature sensor 22 for sensing the temperature of black body heat source 14 and sending a signal representative of the sensed temperature as an input to microcontroller 12. Based upon the temperature sensed, microcontroller 12 causes a temperature controller 24 to increase or decrease power to black body heat source 14. Likewise, rotating wheel 16 is equipped with a temperature sensor 26 for determining the temperature of the rotating wheel 16 and sending a signal representative of the sensed temperature also as an input to microcontroller 12. Based upon the sensed temperature, the temperature of black body heat source 14 is increased or decreased, as discussed below. A heat shield 27 is further disposed between black body heat source 14 and wheel 16 to keep wheel 16 relatively cool.

Rotating wheel 16 is further equipped with a position sensor 28 for determining the angular location of aperture 16a. Based upon an input from position sensor 28 to microcontroller 12, the microcontroller further outputs gated electrical pulses, shown symbolically as numeral 30 as an output of CHS 10. The gated electrical pulses 30 indicate to certain types of HBDs or HWDs 102 when the IR delta is increasing from its reference value to its peak value, and when it is decreasing again back to its reference value. The gated electrical pulses consist of A pulses and B pulses. The A & B pulses can be either positive or negative depending on HBD or HWD systems.

Figure 2:
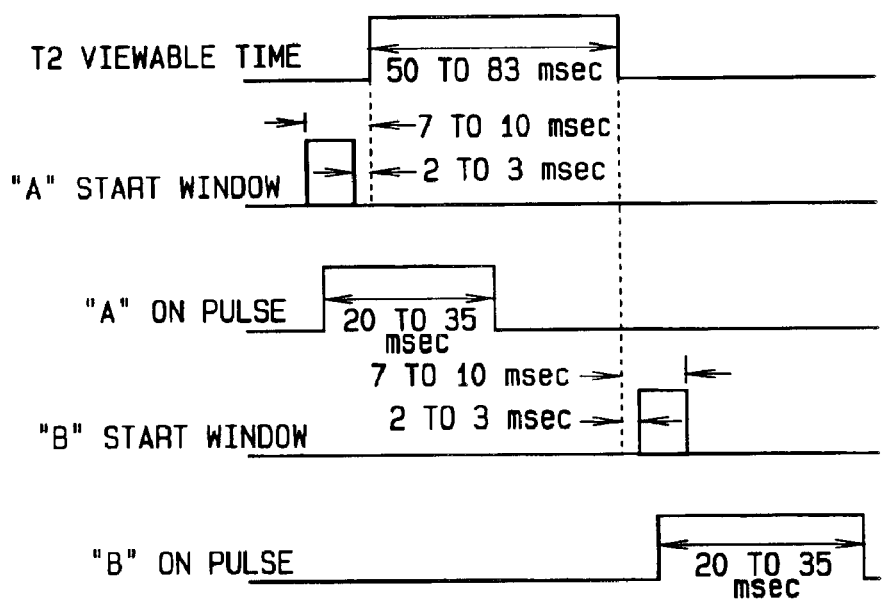
FIG. 2 is a timing chart of gated electrical pulses supplied by the apparatus.

Referring to FIG. 2, the A pulses begin slightly before aperture 16a aligns with the opening of black body heat source 14 and infrared energy passes through the aperture. The A pulse extends for a sufficient period of time to be detected, and may extend into the time which infrared energy is allowed to pass wheel 16. Next, a B pulse begins at a time just after aperture 16a has passed from alignment with black body heat source 14, and the pulse duration is again sufficient for the pulse to be detected. The start window for an A pulse typically begins 7 to 10 msecs before the aperture is in alignment and ends 2 to 3 msecs before the aperture is in alignment, and the pulse lasts 20 to 35 ms. The start window for a B pulse is typically begins 2 to 3 msecs after the aperture is no longer in alignment and ends 7 to 10 seconds after the aperture is in alignment, and the pulse lasts 20 to 35 ms.

Other inputs to the microcontroller 12 include an on/off switch 32 for operating wheel 16, an on/off switch 34 for initiating the gated pulses 30, and an on/off switch 36 for overall power to CHS 10. Other outputs from microcontroller 12 include a "ready to use" indicator 38 to indicate that all portions of the CHS 10 are operating within tolerances and that the appropriate IR delta is obtainable. A ready to use indicator signal 40 may also be passed to HBD or HWD 102 to indicate when calibration may begin. Finally, a "health" status indicator 42 may also be provided to indicate whether CHS 10 is operating properly; for example, is the control of the heat source working properly, or is the control of the wheel 16 working properly.

It is further contemplated that a serial communications port be provided on CHS 10 for communicating with an external computer or other device regarding CHS 10 operation and status, and for providing updated firmware used to operate CHS 10.

An algorithm is employed by microcontroller 12 to determine and maintain the proper temperature of the black body to achieve a desired IR energy delta. This is accomplished using the calculation $P = \sigma \mu (T_{bb}^4 - T_w^4)$, where P equals the desired IR power level, $\sigma$ equals the Stefan-Boltzman constant and $\mu$ equals the emissivity of the black body heat source 14, $T_{bb}$ equals the temperature of the black body and $T_w$ equals the temperature of the wheel.

Microcontroller 12 is programmed with the desired IR power level, Stefan-Boltzman constant and the emissivity of black body heat source 14. Microcontroller 12 receives the temperature of wheel 16 as an input and solves for the desired temperature of black body heat source 14. When the desired temperature of black body heat source 14 is determined, microcontroller 12 acts to increase or decrease the current temperature of black body heat source 14 to the desired temperature. A typical control algorithm is used such as PID to limit over shoot or oscillation of the black body.

Referring back to FIG. 1, CHS 10 is mounted on one of a variety of mounting fixtures 104 to orient CHS 10 in a required position for the type of scanner 100 being calibrated. The fixture and position differs for each different type of scanner 100 to be calibrated. Furthermore, gated electrical pulse 30, a power input 44 and ready to use output 40 are attached to HBD or HWD 102 in accordance with the prior art to communicate with the HBD or HWD 102.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for calibrating a railway infrared hot box or hot wheel detector by delivering a desired radiant energy delta to the hot box detector comprising:

a source of radiant energy source adapted to be positioned adjacent to the hot box detector being calibrated for emitting radiant energy along a path toward the hot box detector;

a shutter device positioned between the source of radiant energy and the hot box detector along the path, with the shutter device being selectively operable between a first mode operation in which the shutter device permits radiant energy to be transmitted from the source to the hot box detector along the path, and a second mode of operation in which the shutter blocks the transmission of radiant energy from the source to the detector;

a temperature sensor for sensing a temperature of the shutter device; and a processor responsive to the temperature sensed by the temperature sensor to operate the energy source at a desired temperature setpoint based on the temperature of the shutter device and the desired radiant energy delta.

2. The apparatus of claim 1 wherein the shutter device is a wheel having an aperture therein and comprises a motor for rotating the wheel.

3. The apparatus of claim 2 wherein the motor is controlled by the processor.

4. The apparatus of claim 1 further comprising a second temperature sensor for sensing a temperature of the energy source.

5. The apparatus of claim 1 wherein a heat shield defining an aperture is mounted along the path and radiant energy is transmitted directly from the source to the hot box detector via the aperture of the heat shield and the shutter device when in its first mode of operation.

6. The apparatus of claim 1 wherein the processor outputs electrical pulses to indicate to the hot box detector when the energy delta is increasing from its reference value to its peak value and when it is decreasing again to its reference value.

7. A device for delivering a constant radiant energy delta to calibrate a railway hot box or hot wheel detector comprising:

a motor attached to a wheel, the wheel defining an aperture and the motor adapted to rotate the wheel;

a first temperature sensor for sensing the temperature of the wheel;

a radiant energy source mounted such that the wheel, when rotated by the motor, alternatingly:

blocks the radiant energy source from directly transmitting radiant energy from the energy source when the aperture, radiant energy source, and hot box detector are not in alignment and allows radiant energy to be transmitted directly from the energy source through the aperture when the aperture, radiant energy source, and hot box detector are in alignment;

a second temperature sensor for sensing the temperature of the energy source; and a processor adapted to receive the temperatures sensed by the first and second temperature sensors, control the motor and operate the energy source at a radiant energy setpoint by determining the present temperature of both the energy source and the present temperature of the wheel and the desired radiant energy delta.

8. The device of claim 7 wherein a heat shield defining an aperture is mounted between the energy source and the wheel and radiant energy is transmitted directly from the device when the aperture of the heat shield and the aperture of the wheel are in alignment.

9. The device of claim 7 wherein the device outputs gated electrical pulses to indicate to the hot box detector when the energy delta is increasing from its reference value to its peak value and when it is decreasing again to its reference value.

10. A device for delivering a constant radiant energy delta to calibrate a railway hot box or hot wheel detector comprising:

a wheel defining an aperture rotatingly supported within the device;

a temperature sensor for sensing the temperature of the wheel;

a radiant energy source mounted such that the wheel, when rotated, periodically allows radiant energy to be transmitted directly from the energy source through the aperture to the hot box detector being calibrated; and an electrical circuit adapted to output a proper energy source setpoint based upon input from the temperature sensor and a desired radiant energy delta setpoint.

11. The device of claim 10 wherein the wheel is rotated by a motor.

12. The device of claim 11 wherein the electrical circuit is a digital processor.

13. The device of claim 12 wherein the motor is controlled by the processor.

14. The device of claim 10 further comprising a second temperature sensor for sensing the temperature of the energy source.

15. The device of claim 10 wherein a heat shield defining an aperture is mounted between the energy source and the wheel and radiant energy is transmitted directly from the device when the aperture of the heat shield and the aperture of the wheel are in alignment with the hot box detector.

16. The device of claim 10 wherein the device outputs gated electrical pulses to indicate to the hot box detector when the energy delta is increasing from its reference value to its peak value and when it is decreasing again to its reference value.

17. A method of calibrating a railway infrared hot box detector by delivering a controlled level of radiant energy to the detector, the method comprising:

transmitting radiant energy from a first high temperature radiant energy source to the hot box detector for a first period of time;

transmitting radiant energy from a second low temperature radiant energy source at a reference temperature for a second period of time;

sensing a parameter indicative of the reference temperature; and controlling the operation of the first high temperature radiant energy source based on the reference temperature so as to emit radiant energy at a desired level in excess of that of the second low temperature radiant energy source.

18. The method of claim 17 wherein the first high temperature radiant energy source operates during both the first and second periods of time and the method further comprises blocking the transmission of the high temperature radiant energy from reaching the detector during the second period of time.

19. The method of claim 17 wherein the first high temperature radiant energy source operates during only during the first period of time and the second low temperature radiant energy source operates during the second period of time.

20. The method of claim 17 further comprising sensing a parameter indicative of the temperature of the first high temperature radiant energy source when in operation and controlling the temperature of the first high temperature radiant energy source to emit the desired level of radiant energy.

* * * * *